(12) United States Patent
Letellier et al.

(10) Patent No.: US 7,774,800 B2
(45) Date of Patent: *Aug. 10, 2010

(54) APPLICATIONS MANAGER WITH VARIABLE MANAGEMENT INSTRUCTION SET

(75) Inventors: Philippe Letellier, Saint Grégoire (FR); Eric Diehl, Liffré (FR); Pierre Houeix, Cesson-Sévigné (FR); Ralf Schaefer, Acigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 1211 days.

This patent is subject to a terminal disclaimer.

(21) Appl. No.: 11/196,186

(22) Filed: Aug. 3, 2005

(65) Prior Publication Data

US 2005/0278721 A1 Dec. 15, 2005

Related U.S. Application Data

(63) Continuation of application No. 09/807,011, filed as application No. PCT/FR99/02426 on Oct. 8, 1999, now abandoned.

(30) Foreign Application Priority Data

Oct. 8, 1998 (FR) .................................. 98 12600

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/329; 719/320; 725/32

(58) Field of Classification Search .................. 719/313, 719/318–320, 329; 725/32–36, 132–142; 709/217–219, 245
See application file for complete search history.

(56) References Cited

U.S. PATENT DOCUMENTS

| 4,419,726 A | 12/1983 | Weidner |
| 5,097,407 A | 3/1992 | Hino et al. |
| 5,321,837 A | 6/1994 | Daniel et al. |
| 5,495,283 A * | 2/1996 | Cowe .......................... 725/33 |
| 5,563,648 A | 10/1996 | Menand et al. |
| 5,635,979 A | 6/1997 | Kostreski et al. |

(Continued)

FOREIGN PATENT DOCUMENTS

JP 10091216 4/1998

OTHER PUBLICATIONS

Rath et al, Set-top box control software: a key component in digital video, Phillips Journal of Research, vol. 50, No. 1/2, 1996, pp. 185-199.*

(Continued)

*Primary Examiner*—Diem K Cao
(74) *Attorney, Agent, or Firm*—Robert D. Shedd; Paul P. Kiel; Guy H. Eriksen

(57) ABSTRACT

An information processing system or a digital decoder (5) makes it possible to process data originating from at least one application (3), for example, by way of a bouquet of television programs, and comprises an operating system (1), a virtual machine (10) and an application manager (4) executing one or more variable management instruction sets (11) so as to influence the operating system (1) and the virtual machine (10) during the execution of the application.

11 Claims, 2 Drawing Sheets

U.S. PATENT DOCUMENTS

| | | | |
|---|---|---|---|
| 5,666,293 A | | 9/1997 | Metz et al. |
| 5,734,904 A | | 3/1998 | Kanamori et al. |
| 5,768,539 A | | 6/1998 | Metz et al. |
| 5,781,228 A | * | 7/1998 | Sposato ........................ 725/32 |
| 5,802,284 A | | 9/1998 | Karlton et al. |
| 5,809,245 A | | 9/1998 | Zenda |
| 5,818,438 A | * | 10/1998 | Howe et al. .................. 715/718 |
| 5,835,765 A | | 11/1998 | Matsumoto |
| 5,937,331 A | * | 8/1999 | Kalluri et al. ............... 725/146 |
| 6,016,158 A | | 1/2000 | Mackinnon |
| 6,061,655 A | | 5/2000 | Xue et al. |
| 6,088,057 A | * | 7/2000 | Hieda ........................ 348/243 |
| 6,108,002 A | * | 8/2000 | Ishizaki ....................... 725/58 |
| 6,119,092 A | | 9/2000 | Patwardhan et al. |
| 6,272,153 B1 | | 8/2001 | Huang et al. |
| 6,334,026 B1 | | 12/2001 | Xue et al. |
| 6,463,585 B1 | | 10/2002 | Hendricks et al. |
| 6,490,633 B1 | | 12/2002 | Linnett et al. |
| 6,600,496 B1 | | 7/2003 | Wagner et al. |
| 6,772,433 B1 | * | 8/2004 | LaJoie et al. .................. 725/52 |
| 7,346,689 B1 | * | 3/2008 | Northcutt et al. ............ 709/227 |
| 2002/0152477 A1 | | 10/2002 | Goodman et al. |

OTHER PUBLICATIONS

European Search Report Dated Jan. 28, 2000.

* cited by examiner

APPLICATIONS MANAGER WITH VARIABLE MANAGEMENT INSTRUCTION SET

This application is a continuing application and claims the benefit of U.S. application Ser. No. 09/807,011, filed Jun. 29, 2001 now abandoned; which in turn claims benefit under 35 U.S.C. §365 of International Application PCT/FR99/02426, filed Oct. 8, 1999, which was published in accordance with PCT Article 21(2) on Apr. 20, 2000 in French, and which claims the benefit of French Application No. 98/12600, filed Oct. 8, 1998. Furthermore, it is also closely related to subject matter and disclosure of U.S. application Ser. No. 11/196,085, filed Aug. 3, 2005 which also claims the benefit of, and is a continuing application of U.S. application Ser. No. 09/807,011, filed Jun. 29, 2001; which in turn claims benefit under 35 U.S.C. §365 of International Application PCT/FR99/02426, filed Oct. 8, 1999, which was published in accordance with PCT Article 21(2) on Apr. 20, 2000 in French, and which claims the benefit of French Application No. 98/12600, filed Oct. 8, 1998.

BACKGROUND OF THE INVENTION

1. Field of the Invention

The invention relates to an information processing system making it possible to process data originating from at least one application, comprising an applications manager executing a management instruction set. The invention also relates to a digital decoder receiving in particular applications by way of a bouquet of television programs.

2. Description of Prior Art

An information processing system can be a machine which makes it possible to process data originating from an application. The application can be a collection of data. The data generally constitute a string of instructions formulated in a programming language. The information processing system can be constructed by using in particular an operating system and an execution system receiving data of an application. The information processing system can also comprise other systems making it possible to manage peripherals attached thereto and generally anything which is not taken onboard by the operating and execution systems.

SUMMARY OF THE INVENTION

An information processing system according to the invention makes it possible to process data originating from at least one application and comprises:
  an operating system for executing the application,
  an execution system, and
  an applications manager which can execute at least one variable management instruction set so as to influence the operating system and/or the execution system in particular when the application is executed or when switching from the execution of the application to another execution of another application.

A first embodiment of the invention makes provision for the information processing system to comprise a means for loading the variable management instruction set from a source of management instructions to the application manager.

A second embodiment of the invention makes provision for the source of management instructions to be the application itself.

A third embodiment of the invention makes provision for the source of management instructions to originate from a supplier of the application.

A digital decoder according to the invention receives at least one application by way of data relating to services from a digital stream and comprises:
  an operating system,
  a virtual machine making it possible to execute at least one application, and
  an applications manager which can execute at least one set of variable management instructions so as to influence the operating system and/or the virtual machine when the application is executed or when switching from the execution of the application to another execution of another application.

A fourth embodiment of the invention makes provision for the variable management instruction set to be of the static declarative kind. The management instruction set describes functions relating to a state or to a transition from an executing application to another program. Each application can contain in a preamble a management instruction set which is of the static declarative kind.

A fifth embodiment of the invention makes provision for the applications manager to comprise several sets of variable management instructions, originating from several sources of management instructions.

A sixth embodiment of the invention makes provision for the applications manager to comprise a means of selecting the variable management instruction set which selects a management instruction set in accordance with at least one criterion determined so that the selected management instruction set has priority of execution.

BRIEF DESCRIPTION OF THE DRAWING

In what follows, exemplary embodiments of the invention are described so as to afford a better understanding thereof. Reference is made to FIGS. 1 to 3.

DETAILED DESCRIPTION

Figure 1:
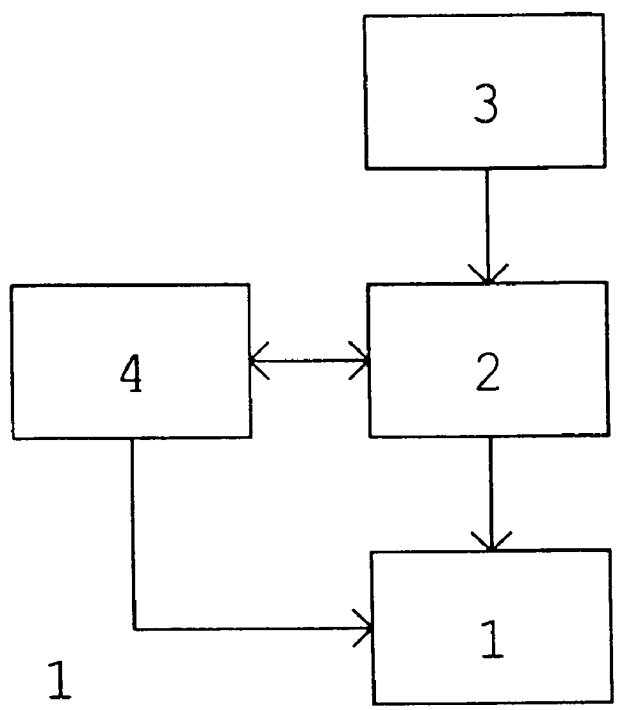
FIG. 1 containing a simplified diagram of an information processing system.

An information processing system represented in FIG. 1 can be constructed by using an operating system 1. The operating system 1 comprises software making it possible to manage tasks, to allocate space in a memory and to address peripheral devices in conjunction with the information processing system.

An execution system 2 receives, directly or indirectly by way of a memory, data of an application 3. The execution system 2 makes it possible to execute the string of instructions conveyed by the data. The execution system 2 can be constructed with the aid of software. The execution system 2 communicates with the operating system 1 so as to access in particular the peripheral devices and a memory (not represented) of the information processing system.

The information processing system can comprise an applications manager 4. The latter makes it possible to execute a management instruction set. Thus, the applications manager 4 makes it possible to influence the operating system 1 and/or the execution system 2 when the application is executed for example. It would for example be possible for the applications manager 4 to indicate to the operating system 1 what priorities to give to commands originating from the execution system 2 when the application is executed.

The operating system, the execution system and the applications manager are, according to the present example, software executed by a microprocessor or an equivalent means. All this software is stored in one or more memories of the apparatus of FIG. 1.

Figure 2:
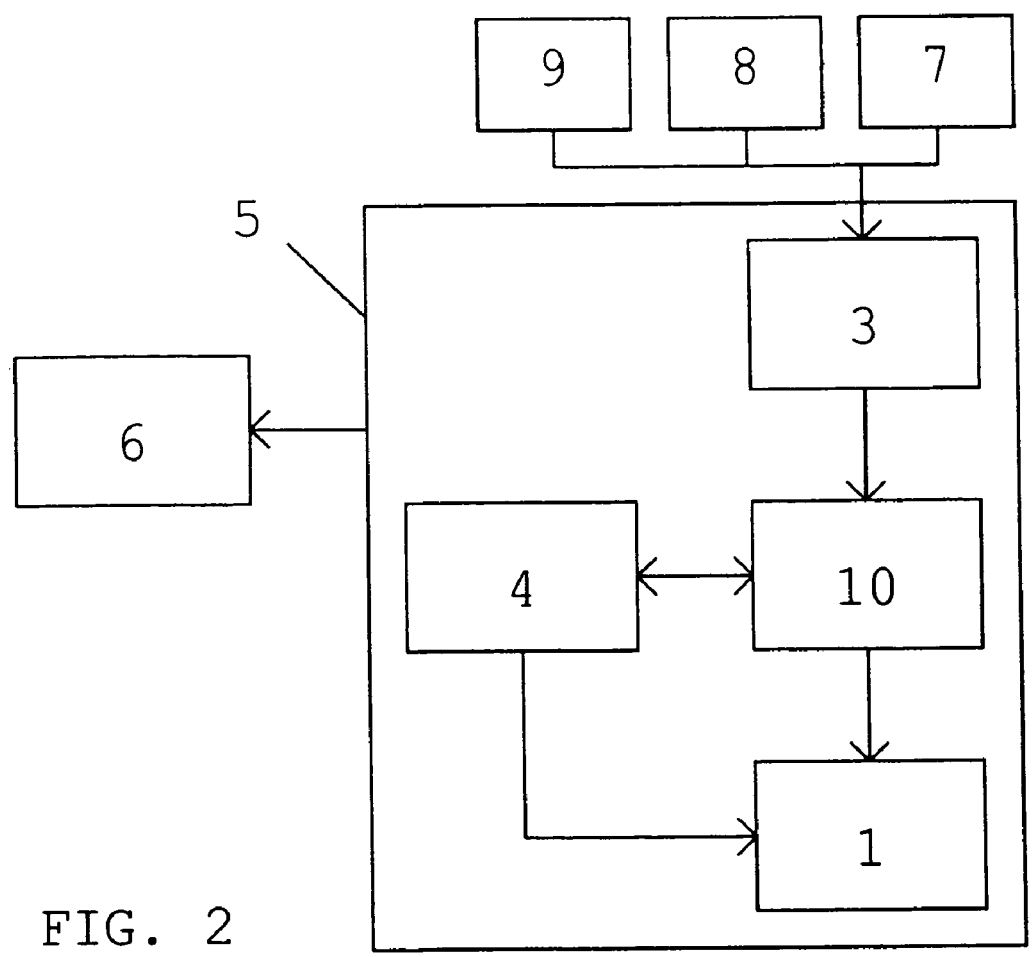
FIG. 2 containing a simplified diagram of a digital decoder.

A digital decoder 5 for television 6 represented in FIG. 2 makes it possible to receive an application 3 by way of a satellite receiver 7, a cable network 8 and/or a hertzian antenna 9. The decoder is for example a decoder meeting the DVB and MPEG II standards. The application is transmitted in a multiplexed digital stream, the latter not necessarily transporting an audiovisual television program. It is also possible to receive other applications on other multiplexes. Moreover, it is also possible to receive applications by way of a digital channel modulated on an analog signal and time-division multiplexed with an analog television signal, but in what follows we shall generally be concerned with the case of a totally digital system.

The operating system 1 makes it possible in particular to manage inputs/outputs and a memory (not represented) of the digital decoder 5. A virtual machine 10 makes it possible to execute the application 3. The virtual machine 10 is an exemplary execution system 2 which makes it possible to execute an application written in a so-called portable language. Another virtual machine 10 could be implemented in respect of an information processing system other than the digital decoder 5, thus making it possible to execute the application 3 on this other system.

The digital decoder 5, and more especially, the assembly formed by the operating system 1 and the virtual machine 10, can be designed to execute several applications in a multitask manner, that is to say at the same time.

The digital decoder 5 furthermore comprises hardware and/or software components (not represented) such as one or more drivers so that the operating system can communicate with peripheral devices, a user interface allowing a user to communicate with the application 3 executed or with the digital decoder 5 and optionally comprising one or more function keys, a memory making it possible to store the application 3, possible other applications or graphical data, etc. The decoder can also comprise decoding means (MPEG II audio and video decoding according to the present example) making it possible to decode a demultiplexed stream of audiovisual data from a multiplexed digital stream and to transmit the decoded video to the television 6.

The application manager 4 makes it possible to execute a management instruction set and communicates with the virtual machine 10 and the operating system 1. It carries out functions which are not taken on board either by the virtual machine 10, or by the operating system 1.

The functions resulting from the execution of the management instruction set are for example the following:

consideration of a state of the executing application when a change of transponder (corresponding to a multiplexed stream) or of service occurs. The change of transponder/service can be brought about for example by a user, by the application itself or even by a broadcaster (which are not represented) which broadcasts the content of the streams. The applications manager 4 can, for example, interrupt the executing application or place it on standby. The applications manager 4 can freeze the last picture displayed on the television or display a specified graphic while the change of transponder and/or of the service is effected. This may be necessary to fill in time while loading another application from a stream from the new transponder or associated with another service;

starting a specified procedure when a change of application has not been performed within a specified time span;

configuring function keys and rendering them active or otherwise;

determining in which order to enable audio, video components when the latter are transmitted with the application associated with a service and when the application calls upon them etc.

The management instruction set is stored in a management memory (not represented in FIG. 2) and cannot be modified during normal use of the digital decoder 5. The management instruction set is relatively voluminous and complex. Its formulation deploys a considerable development effort. Thus, each time a modification of the management instruction set is required to obtain a different manner of operation of the applications manager 4, it is necessary for a manufacturer or for a programmer of the applications manager 4 to re-embark on a new development of a complete set of management instructions and on a new configuration of the digital decoder 5, in particular the replacement or the total reprogramming of the applications manager 4, this possibly entailing major costs.

It would be advantageous to be able to modify the management instruction set at lesser cost.

It would also be advantageous to be able to update the application manager 4 while avoiding having to install a new configuration in the digital decoder through intervention by the manufacturer on the digital decoder.

Figure 3:
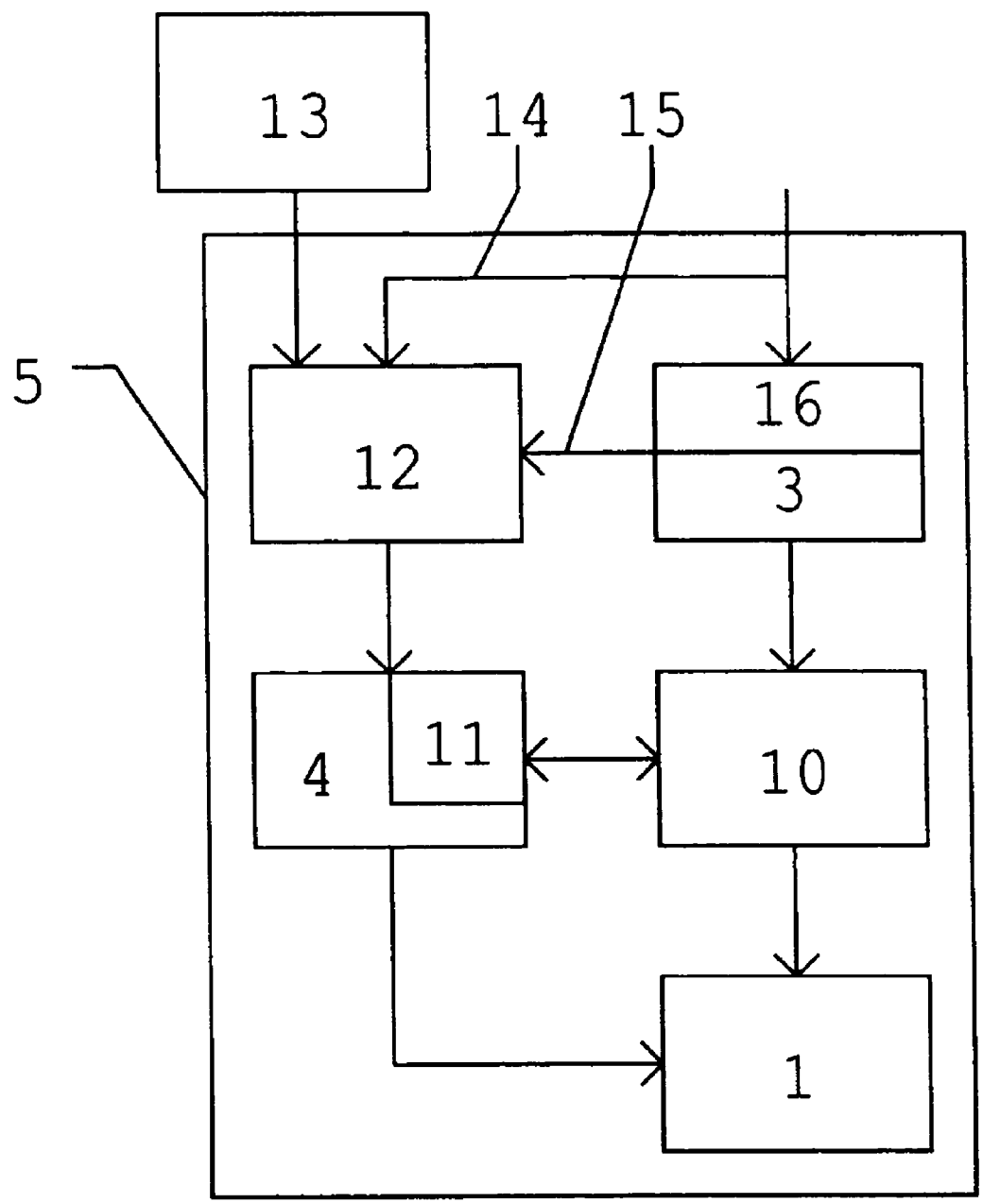
FIG. 3 containing a simplified diagram of another digital decoder.

FIG. 3 contains the diagram of a digital decoder 5 comprising the operating system 1 and the virtual machine 10.

The application manager 4 comprises a variable management instruction set 11, that is to say one which can be modified, exchanged or erased at any moment.

Thus, part of the management instruction set can be changed to satisfy a variable specification of the application manager. This avoids new development of a complete set of management instructions.

The variable management instruction set 11 is executed by the application manager 4, this resulting in a number of functions which are implemented via communication with the operating system 1 and the virtual machine 10. These functions can be the same as those described earlier in this description. However, the list of functions described is not exhaustive. It is simply intended to explain through examples the role of the applications manager 4.

The variable management instruction set 11 can be stored in a rewritable memory, for example, in a random access memory. A loading means 12 makes it possible to load the variable management instruction set 11 to the applications manager 4. The loading means 12 can be linked to one or more sources of management instructions; for example a user interface 13 of the digital decoder 5, a direct link 14 with a source of the applications, an application link 15 with the application 3 itself. In the latter case, the variable management instruction set 11 can be contained in a preamble 16 of the application 3. The preamble 16 is a first part of the application 3 received by the digital decoder 5. Having received the variable management instruction set 11, the application manager 4 can execute these instructions and carry out corresponding functions while the application 3 is being loaded in full.

Moreover, the decoder can comprise a default instruction set, which is short-circuited by an instruction set loaded later, if certain criteria, for example priority criteria, are fulfilled. This short-circuiting can be associated with one or more applications. In this case, the default instruction set is not erased, but remains available for other applications.

The loading means 12 is for example a digital packet demultiplexer of the MPEG II Systems type received by way of the direct link 14. The source of applications may be multifold: a server linked to the decoder 5 via the switched telephone network, a satellite, cable or hertzian digital or analog broadcasting network, etc. The necessary circuits for reception and demodulation are not illustrated, since they are well known per se to those skilled in the art. The existence of a preamble 16 does not necessarily entail the existence of the application 3. It is conceivable to include a management instruction set in the preamble 16 and to transmit the latter to the loading means 12, even without there being an associated application.

In the case where the source of the management instructions is the direct link 14 with a source of the applications, it is possible for a broadcaster of the application to supply a specific set of management instructions for his applications. The latter set may for example entail the application manager 4 displaying a graphic characteristic of the broadcaster during the waiting time caused by the loading of an application.

In the case where the source of the management instructions is the user interface 13, it is possible for a user to determine for example the functions underlying certain tasks of the digital decoder 5. As already mentioned, if an instruction set local to the decoder exists, it may be short-circuited under condition by a loaded set.

In the case where no external source such as the user interface 13, the direct link 14 or the application link 15 supplies management instructions, provision may be made to use a standard management instruction set stored permanently in the applications manager 4.

In an advantageous embodiment there is provision for the management instruction set originating from different sources to be given priorities for execution, according to a predetermined criterion. Thus, it may for example be defined that a management instruction set originating via the application link 15 has priority over an instruction set originating via the direct link 14 with a source of the applications. The applications manager receiving or having received management instruction sets from these two links 14 and 15, gives priority to the execution of that originating from the application link 15.

The variable instruction set 11 can have a variable volume. For example, provision could be made for the latter to comprise management instructions originating from several sources of management instructions. Thus, if the decoder allows the execution of several applications in parallel, it is possible for the application manager 4 to carry out different functions for each executing application.

An example of the behavior of a decoder will be described in what follows.

According to this example, the applications manager comprises the following instructions:
Display a boot-up bitmap
Set the video screen to black
Freeze the video image
Define the keys managed by the application at the outset (group of keys of the remote control)
Take the focus if possible
Enable audio/video
Disable audio/video
The parameters supplied in respect of or with a given application are:
Boot-up bitmap (optional)
Group of keys
Priority of the application It is assumed that initially the state of the decoder is the following:
Audio/video in progress: yes
Priority with the foreground application ("possessing the focus"): 1 (navigator)
Applications executing:

| Name | Supplier | Priority | Focus |
|---|---|---|---|
| Weather | Broadcaster X | 2 | No |
| Navigator | Decoder manufacturer | 1 | Yes |

In the case of the present example, the navigator is an application built into the decoder at the outset and allowing the user to implement the decoder.

A request for focus on the part of an application signifies according to the present example that this application is requesting to be executed in the foreground. The other applications may nevertheless be executed in parallel, in the "background", if the system is multitask.

A new application is then loaded, for example a telepurchasing application, also supplied by the broadcaster X, this loading being triggered by the detection of the broadcasting of the application in the digital stream received by the decoder.

New application:

| Name | Provider | Priority | Focus request |
|---|---|---|---|
| Shop | Broadcaster X | 2 | Yes |

The (default) static instruction set of the decoder is:
Define the keys managed by the application on start up (group of keys)
If Request Focus Then Take the focus if possible
(Remark: the possibility of taking the focus depends on the priority of the application which made the request relative to that possessing the focus)
The instruction set present in the signal and positioned by the broadcaster X for the Shop application is the following:
Set the video plane to black
If audio/video in progress Then disable audio/video
Define the keys managed by the application on start up ({Quit, P+, P−})
If Request Focus Then Take the focus if possible
Instruction set present in the application:
Enable audio/video
The following dynamic behavior results from this collection of sets:

1. The application is being initiated, an instruction set must be applied (before initiation of the application). The broadcaster has given an instruction set for this application which has priority over the default instruction set of the terminal. It is therefore the set of the application which is applied.
2. The video plane is set to black.
3. The audio/video which is currently playing is stopped.
4. The Quit, P+ and P− keys of the remote control will not be managed by the terminal when the application has the focus.
5. Focus is requested, but denied since the Shop application has lower priority than the application having the focus (Navigator)
6. The application is initiated (without the focus)

7. The application applies its complementary instruction set and enables a new audio/video stream.

The new state of the decoder is then:
Audio/video in progress: yes
Priority for the application having the focus: 1 (Navigator)
Applications executing:

| Name | Supplier | Priority | Focus |
|---|---|---|---|
| Weather | Broadcaster X | 2 | No |
| Navigator | Decoder manufacturer | 1 | Yes |
| Shop | Broadcaster X | 2 | No |

The advantages of the invention are numerous.

A broadcaster or a supplier of services can himself define the behavior of a decoder, relating to the initiation of a downloaded application, through management of the priorities of the instruction sets and by including, for example, an instruction set in the preamble of the application, in such a way that this set can be executed while the application finishes being loaded.

A broadcasting of management instruction sets by way of the service information of a digital stream makes it possible to define the conditions of initiation of applications, without the broadcasting of these sets necessarily having to be done at the same time as that of the application.

The manufacturer of the hardware (decoder in the present case) can also monitor the behavior of an application. For example, by choosing the priorities appropriately, he can retain full control of the decoder and force any application to use the predetermined management instruction set.

| LIST OF REFERENCES | |
|---|---|
| 1. | Operating system |
| 2. | Execution system |
| 3. | Application |
| 4. | Applications manager |
| 5. | Digital decoder |
| 6. | Television |
| 7. | Satellite receiver |
| 8. | Cable network |
| 9. | Hertzian antenna |
| 10. | Virtual machine |
| 11. | Variable management instruction set |
| 12. | Loading means |
| 13. | User interface |
| 14. | Direct link with a source of applications |
| 15. | Application link |
| 16. | Application preamble |

The invention claimed is:

1. A device for managing an application composed of instructions executable by an execution system, said execution system communicating with an operating system so as to access resources of the device, wherein the device comprises an applications manager, including a storage medium, which can execute at least one received management instruction set, said application manager executing management instructions from said at least one received management instruction set both before running of the application and during running of the application, said at least one management instruction set modifying via functions a state of the device before the running of the application executed by the operating system and/or the execution system and the running of said application, said at least one management instruction set being executed upon a change of state and/or upon an event external to the device, and executed before the launching of the application and during the running of this application, said at least one management instruction set being provided by an external source, wherein said application manager comprises several sets of management instructions originating from several sources of management instructions; a specified management instruction set being assigned to each application.

2. The device for managing an application as claimed in claim 1, wherein the functions of the management instructions cannot be executed by the operating system or the execution system.

3. The device for managing an application as claimed in claim 1, characterized in that it comprises a means for loading the management instruction set from a source of management instructions to the applications manager.

4. The device for managing an application as claimed in claim 3, wherein the source of management instructions is the application.

5. The device for managing an application as claimed in claim 3, wherein the source of management instructions is the user interface.

6. The device for managing an application according to claim 3, wherein the device possesses a standard management instruction set in memory.

7. The device for managing an application as claimed claim 1, wherein binary priority indicators are associated with the management instructions, the applications manager executing first the management instructions whose priority is the highest.

8. The device for managing an application as claimed in claim 1, wherein, if several management instruction sets can be applied to an application before the launching of this application, the one with the highest priority being used by the application manager.

9. The device for managing an application as claimed in claim 1, wherein a management instruction contains the priority of an application, at the reception of such instruction, the application manager modifying the priority of the applications executed in the device.

10. The device for managing an application as claimed in claim 9, wherein the application manager allows a resource of the device to the application having the highest priority.

11. Digital decoder furnished with means for receiving at least one application, said application being composed of instructions executable by an execution system, said execution system communicating with an operating system so as to access the resources of the device, wherein the device comprises an applications manager, including a storage medium, which can execute at least one set of at least one received management instruction, said application manager executing a management instruction set from said at least one set of at least one received management instruction both before running of the application and during running of the application, said management instruction modifies via a function the state of the device before the running of the application executed by the operating system and/or the execution system and the running of this application, and said management instruction is executed before launching the application and during the running of said application, said management instructions being provided externally to the decoder with means, wherein said management instruction contains an identifier of an application, at the reception of such instruction, the application manager applies this management instruction to the specified application.

* * * * *